No. 888,912. PATENTED MAY 26, 1908.
B. G. LAMME.
METHOD OF OPERATING AND SYSTEM OF CONTROL FOR ELECTRICAL GENERATORS.
APPLICATION FILED AUG. 2, 1906.
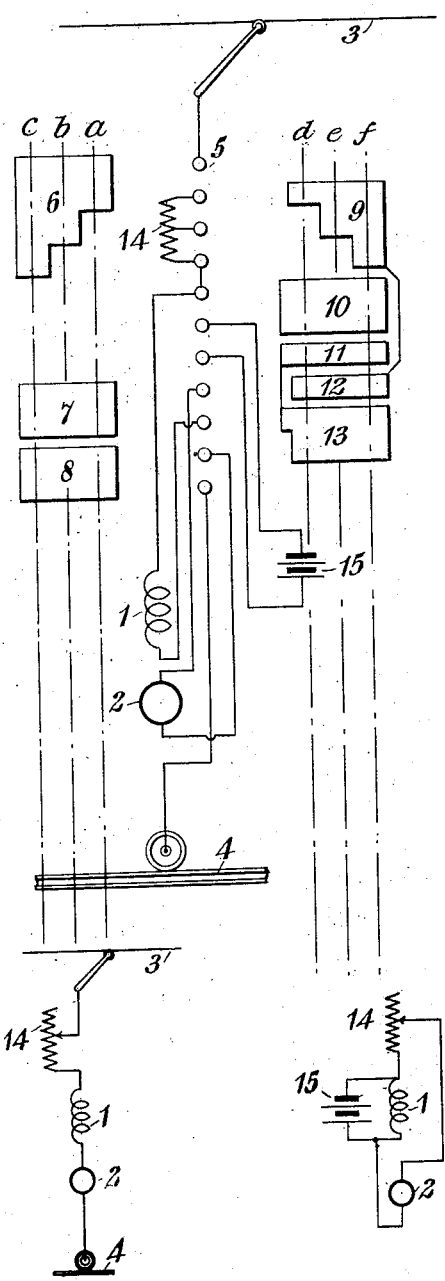
WITNESSES:
C. L. Belcher
Otto S. Schairer
INVENTOR
Benjamin G. Lamme
BY
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF OPERATING AND SYSTEM OF CONTROL FOR ELECTRICAL GENERATORS.

No. 888,912.      Specification of Letters Patent.      Patented May 26, 1908.

Application filed August 2, 1906. Serial No. 328,870.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Methods of Operating and Systems of Control for Electrical Generators, of which the following is a specification.

My invention relates to methods of operating, and to systems of control for, dynamo-electric machines having series-connected field magnet and armature windings.

The object of my invention is to provide a method of, and means for, causing electrical motors, having series-connected field magnet and armature windings to operate as braking generators under stable conditions.

Electrical motors that are employed for the propulsion of railway and other vehicles are usually of the series type, and may be readily converted into braking generators, by reversing the connection of either the field magnet or armature windings. However, if such a machine is connected to a braking resistance or other circuit, it may pick up very suddenly as a generator and cause a violent shock because of the excessive load. It, also, will not operate as a generator under stable conditions unless some means is provided for maintaining the field magnet strength substantially constant.

According to the present invention, a storage battery is connected in shunt relation to the field magnet winding before the machine is connected to the braking circuit, so that it will begin operation as a separately excited generator and no severe shock will result. The storage battery remains connected in shunt relation to the field magnet winding during operation of the motor as a generator, and serves to cause a substantially constant amount of current to be supplied to the field magnet winding, so that stable conditions of operation are maintained.

In another application Serial No. 306,217, filed by me March 15, 1906, I have claimed broadly methods of, and means for, maintaining substantially constant field strength in generators having series-connected field magnet and armature windings, and in that application I have shown and described means for effecting the desired result in either direct current or alternating current motors. The means of the present application is a modification of those set forth in the above mentioned application and is especially adapted to be employed in connection with direct current motors.

The single figure of the accompanying drawing is a diagrammatic view of a system of control that embodies my invention.

A motor that comprises field magnet and armature windings, 1 and 2, respectively, may be supplied with current from a suitable circuit, such as that which comprises a trolley conductor 3 and a track rail 4, and the circuit connections and arrangements of the field magnet and armature windings may be governed by means of a controller that comprises a plurality of stationary contact fingers 5 and a plurality of movable conducting segments 6, 7, 8, 9, 10, 11, 12, and 13 that may be brought, in any suitable manner, into engagement with the stationary contact fingers along the position-indicating lines $a$, $b$, $c$, $d$, $e$, and $f$. In operating the motor as a propelling means for a vehicle upon which it may be mounted, the controller is first moved to the position indicated by the broken line $a$, whereupon the field magnet and armature windings, 1 and 2, become connected in series relation and in series with a suitable resistance 14. The circuit thus established is by way of the parts bearing reference characters 3, 6, 14, 1, 7, 2, 8, and 4 and is shown diagrammatically just below the conducting segments 6, 7, and 8. As the controller is moved to the succeeding positions $b$ and $c$, the resistance 14 is gradually removed from the motor circuit, there being nothing novel in the manner in which circuits of the machine are controlled when operating as a motor.

When it is desired to operate the motor as a braking generator, the controller is first moved toward the position indicated by the broken line $d$, whereupon a storage battery 15 becomes connected in shunt to the field magnet winding which is thus separately excited. When the controller reaches the position $d$, the field magnet and armature windings are again in series relation, though the connection of the armature to the field magnet is reversed, and the resistance 14 is connected in closed circuit therewith in the usual manner. The battery remains connected between the terminals of the field magnet winding to serve as a shunt therefor of substantially constant voltage and it is preferably of a voltage equal to the drop of potential over the field magnet winding under the most usual or normal conditions of operation. When but a small amount of current is generated by the machine, and only a small drop of potential occurs over the field magnet winding by reason of the armature current that traverses it, the storage battery will assist in supplying current to the field magnet winding and will serve to maintain the field magnet strength at substantially its normal value. If the machine generates more than the normal amount of current, the drop of potential over the field magnet winding caused by this current will be increased above the voltage of the storage battery and the battery will be charged by the current generated in excess of the amount necessary to maintain the field magnet strength at substantially its normal value. Thus the field magnet strength is maintained substantially constant.

It will, of course, be understood that the invention may be employed in systems comprising more than a single motor, the circuit arrangements and connections of which may be adjusted in any desired or suitable manner.

I claim as my invention:

1. The method of operating a generator having series-connected field magnet and armature windings, which consists in first connecting a secondary battery in shunt relation to the field magnet winding and in then connecting the generator in a braking circuit.

2. The combination with an electrical generator having series-connected field magnet and armature windings, a secondary battery and a circuit, of means for first connecting the battery in shunt to the field magnet and then connecting the generator to the circuit.

In testimony whereof, I have hereunto subscribed my name this 28th day of July, 1906.

BENJ. G. LAMME.

Witnesses:
OTTO S. SCHAIRER,
BIRNEY HINES.